UNITED STATES PATENT OFFICE.

HERMANN T. VULTÉ, OF NEW ROCHELLE, NEW YORK, ASSIGNOR TO JOHN H. WINGFIELD, OF NEW YORK, N. Y.

PROCESS OF TREATING SUINT AND PRODUCTS RESULTING THEREFROM.

SPECIFICATION forming part of Letters Patent No. 571,870, dated November 24, 1896.

Application filed February 16, 1895. Serial No. 538,701. (No specimens.)

*To all whom it may concern:*

Be it known that I, HERMANN T. VULTÉ, a citizen of the United States of America, residing at New Rochelle, county of Westchester, State of New York, have invented certain new and useful Improvements in the Treatment of Suint or Wool-Fat, of which the following is a specification.

My invention is an improved process of refining suint or wool-fat to render it more suitable for pharmaceutical and other uses; and it consists, further, in certain improved products, all as hereinafter more fully described and claimed.

The term "suint" is used to define the mass of wool-fat, potash compounds, albuminoids, glycerides, free fatty acids, if any free fatty acids are present, and other substances found on wool.

In my process I dissolve the crude suint in a warm heavy petroleum-oil having certain properties hereinafter described. I may apply it to the suint or to crude wool-fat obtained from any source or by any method, as, for instance, to ordinary commercial wool-fat such as is recovered from the scouring-waters of woolen-mills. The exact quantity of solvent used is unimportant, except that there should be enough of the warm solvent to dissolve thoroughly the constituents of the suint or wool-fat soluble therein; but it is desirable to avoid the use of light hydrocarbons, and in the process of recovery ordinary commercial wool-fat frequently acquires foreign matter and loses some of the valuable and characteristic constituents of suint, whereby the products ultimately obtained are different and less valuable than the products obtained by my process when applied to the suint as it exists on the wool. Therefore, while my process can be applied to the refining of other forms of wool-fat than are indicated by the term "suint" as used herein, I do not claim the products obtained, except by application of the solvents hereinafter described to substances containing the essential constituents of suint stated herein as present in the products claimed. Therefore I prefer to obtain the crude suint directly from the wool by applying thereto as a solvent of the suint the warm heavy petroleum-oil having the properties hereinafter described. A convenient method of treating the fiber in carrying out my process is to place a quantity of wool in the grease in a suitable vessel with a sufficient amount of the solvent to completely cover the wool, say about one-half to one gallon of solvent to each pound of wool. The temperature of the solvent should be about 135° Fahrenheit. This heat will not injure the fiber. After the wool is steeped until the suint is abstracted and has been dissolved, which will require from ten to twenty minutes, the solution is drawn off and subjected to the further steps of the process.

The solubility of the suint in the petroleum-oils varies not only with the temperature, but with the specific gravity of the solvent. Some of these oils deposit from a warm solution entirely or in large measure certain of the constituents of the suint on cooling and retain in solution entirely or in large measure other constituents of the suint, and the products obtained by this separation are new and valuable. The oils which possess this property have as a rule high boiling-points, and they can be heated sufficiently to accomplish the solution of the suint in open vessels with safety. The temperatures to which they must be cooled in order to effect the valuable separations which I have indicated need not be lower than the ordinary temperatures which are usually maintained in woolen-mills, which of course vary somewhat with the season, but may be stated roughly as between 65° and 80° Fahrenheit. Therefore a main point of advantage in my process is that it can be carried on conveniently in open vessels in woolen-mills without the necessity of heating the solvents to a dangerous point or of cooling them artificially. Both the paraffin or cracked and the neutral or uncracked petroleum-oils possess the desired property, but the neutral oils are preferable because they do not stain the wool. By a "neutral" or "uncracked" oil I mean a once-run distillate of petroleum freed more or less from bloom. I recommend neutral oils of specific gravity 30° to 38° Baumé. I prefer to use a solvent of the specific gravity 30° to 38° Baumé, which boils under ordinary atmospheric pressure at a temperature so high as to be heated to the temperatures indicated herein with entire safety in open vessels, but I wish to be understood that the specific gravity may be higher or lower. My experiments seem to show that the peculiar solvent properties herein described are found in the whole class of heavy or high-boiling petroleum-oils, ranging from about 22° to 38° Baumé; that they are found to no practical extent in the light petroleum-oils, such as the naphthas, and that the kerosene-oils, ranging from 47° to 51° Baumé, are about on the dividing-line.

I make no claim to the foregoing steps nor to the crude products resulting therefrom, as they form no part of my invention. The novel features of my process are brought into play after the warm solution is drawn off from the wool.

For many uses it is desirable to eliminate certain constituents from the suint, as the albuminoids, potash compounds, coloring and odoriferous matter, and dirt. This I accomplish by the steps of the process which I will now describe, by which I obtain a refined neutral anhydrous wool-fat consisting, mainly, of the cholesterin group of constituents, which is almost entirely free from odor, and which, either in the anhydrous form in which it is produced by my process or in the form of a hydrate, is efficacious and suitable for pharmaceutical and other uses.

By the "cholesterin group of constituents" I mean cholesterin, isocholesterin, and the cholestryl and isocholestryl ethers and other cholesterin and isocholesterin compounds, if any others are present. These are the most valuable constituents of the deposit. The term "glycerides" is used in its ordinary sense to define combinations of glycerin with fatty acids.

In carrying out the process, after the crude suint has been thoroughly dissolved and the suint solution has been drawn off from the wool, as above indicated, the temperature is maintained for from thirty-six to forty-eight hours. It may with advantage even be increased to about 180° Fahrenheit, thus cutting down the time necessary to maintain the temperature; but this is not necessary. During this period of heating, the albuminoids, potash compounds, a dark-brown liquid of bad odor containing much of the odoriferous and coloring matter of the suint, and other insoluble matter, such as dirt, separate and settle to the bottom of the vessel, while the fatty constituents of the suint remain in solution. Thus a partial separation of the constituents of the suint is effected. This part of my process is somewhat facilitated by adding to the solution a small amount of fuller's earth or similar agent, but I do not generally use this. After the insoluble matter has settled, as described, the clear supernatant liquid is siphoned off or otherwise separated therefrom. This liquid contains in solution mainly the cholesterin group of constituents of the suint, the glycerides, any free fatty acids which may have been present in the suint originally or produced in the process of recovering the suint from the wash-waters, if it is so obtained, the ceryl and cetyl compounds of the suint, and perhaps some other fatty substances.

To obtain a refined neutral anhydrous wool-fat consisting chiefly of the cholesterin group of the suint, the solution after it has been drawn off from the deposit of insoluble matter, as above described, is permitted to stand twelve to forty-eight hours and cool down to the atmospheric temperature. During this time the cholesterin group of constituents separate out from the solution in great part. The product, which consists of the refined suint partly dissolved in and partly deposited from the oil which is used as a solvent, is itself a valuable product without separating the deposit and solution. It makes a good leather-oil and a good heavy lubricant; but if it is desired to separate the wool-fat from the solvent the supernatant liquid may be siphoned off or otherwise separated.

The deposited mass, if it is desired, can be freed from the liquid dispersed throughout it by filters, of felt or other suitable material, and finally passed through a hot filter to remove any dirt or other foreign material that may remain in it.

This refined wool-fat differs from any other known forms in being neutral and more unctuous, and also in its main constituents. The difference in unctuousness is probably due to the comparative absence of ceryl and cetyl compounds and free fatty acids. The product also contains all or nearly all of the cholesterin group of constituents of the suint, substantially as they exist on the wool, constituents which are not found in ordinary lanolin or agnin. The product is also nearly free from glycerides, and therefore does not become rancid even on long exposure to the air. It is, moreover, anhydrous, since no water is used in its preparation, and it is free from the albuminoids, potash compounds, free fatty acids, dirt, and most of the coloring and odoriferous matter of the suint. If the suint has been obtained from wash-waters, the product is also free from the soaps introduced in its removal from the wool. It is a yellowish translucent and unctuous substance with a slight but not unpleasant odor. There is interspersed throughout the mass a small quantity of the solvent used. The liquid product thus obtained by separating the cholesterin group of the constituents of the suint from the refined solution is also valuable. It is an excellent lubricant, its properties as such being improved by the remnant of the cholesterin group of constituents in solution. It is also good as an oil to be used on leather, and the solvent can be used over again in the removal of suint from wool until it becomes saturated with those constituents of the suint which ultimately remain in solution. It is a clear refined product with a slight but not disagreeable odor of the crude suint.

The solvents which possess the herein-described property as to the solubility of suint are not useful in equal degree in carrying out this process. Thus the aromatic hydrocarbons found in oils of coal-tar origin impart a distinctive and disagreeable odor. The American petroleum is preferable to the Russian petroleum, because it is comparatively free from the aromatic group of hydrocarbons, and, as is above stated, among the petroleum-oils, the neutral oils are preferable to the paraffin-oils because they do not stain the wool.

All specific gravities herein specified are assumed to be determined at a temperature of about 60° Fahrenheit. The table of specific gravities and degrees Baumé in *Cairn's Quantitative Chemical Analysis* (Henry Holt & Co., 1890) is followed.

Having now particularly described and ascertained the nature of my invention and in what manner the same is to be performed, I declare that what I claim is—

1. The process of separating the cholesterin group of constituents of suint from the more soluble and the insoluble constituents, consisting in dissolving the suint in a warm petroleum-oil which forms a solution of the suint, and while keeping the solution heated depositing first the insoluble matter from the solution and then by cooling depositing the cholesterin group of constituents, substantially as described.

2. The process of separating the cholesterin group of constituents of suint from the more soluble and the insoluble constituents, consisting in dissolving the suint in a warm petroleum-oil of specific gravity 30° to 38° Baumé, and while keeping the solution heated depositing first the insoluble matter from the solution, and then by cooling depositing the cholesterin group of constituents, substantially as described.

3. As a new composition of matter, the refined liquid product from which the insoluble matter and cholesterin group of constituents have been removed, consisting of the residue of suint dissolved in a petroleum-oil of specific gravity not higher than 51° Baumé, substantially as described.

4. As a new composition of matter, the refined liquid product from which the insoluble matter and cholesterin group of constituents have been removed, consisting of the residue of suint dissolved in a petroleum-oil of specific gravity 30° to 38° Baumé, substantially as described.

5. As a new composition of matter, the neutral wool-fat substantially such as results from the treatment of suint in the manner described and consisting mainly of the described cholesterin group of constituents of suint, substantially as described.

6. As a new composition of matter, the refined product from which the insoluble matter has been removed, consisting of the mixture of the deposit and solution obtained by subjecting suint to the action of a warm petroleum-oil of specific gravity not higher than 51° Baumé, substantially as described.

7. As a new composition of matter, the refined product from which the insoluble matter has been removed, consisting of the mixture of the deposit and solution, obtained by subjecting suint to the action of a warm petroleum-oil of specific gravity 30° to 38° Baumé, substantially as described.

Signed in New York city, State of New York, United States of America, this 14th day of February, 1895.

HERMANN T. VULTÉ.

In presence of—
SAMUEL W. BALCH,
DELANCEY W. WARD.